United States Patent [19] [11] 4,149,801
Volk [45] Apr. 17, 1979

[54] METHOD AND APPARATUS FOR MEASURING ASPHERIC CONTACT LENS SURFACES

[76] Inventor: David Volk, 2460 Fairmount Blvd., Cleveland, Ohio 44106

[21] Appl. No.: 769,544

[22] Filed: Feb. 17, 1977

[51] Int. Cl.² .............................................. G01B 9/00
[52] U.S. Cl. ........................................ 356/124; 350/86
[58] Field of Search ....................... 356/124, 127, 125; 350/86, 91

[56] References Cited

U.S. PATENT DOCUMENTS

| 3,019,708 | 2/1962 | French et al. | 350/91 |
| 3,274,885 | 9/1966 | Rocher et al. | 350/86 |
| 3,499,715 | 3/1970 | Hansen et al. | 350/91 |
| 3,540,828 | 11/1970 | Nupuf | 356/127 |

Primary Examiner—John K. Corbin
Assistant Examiner—R. A. Rosenberger
Attorney, Agent, or Firm—Baldwin, Egan, Walling & Fetzer

[57] ABSTRACT

This invention consists of an improvement in known measuring microscopes and the method of use of such microscope for measuring radii of curvature of contact lens surface areas by catoptric imagery, by attaching a novel lens holding stage with an adjustable lens holder to the measuring microscope below the objective lens thereof and supporting an optical contact lens, either semi-finished or finished, in said holder, with provisions for tilting the lens holder of the stage a selected angular amount about a lens holder axis and translating the lens holder along a horizontal translation axis perpendicular to the lens holder axis, both the lens holder axis and the horizontal translation axis being perpendicular to the optical axis of the microscope, the horizontal translation axis intersecting both the optical axis of the microscope and the lens holder axis, tilting the optical contact lens a given angular amount about the lens holder axis and translating the lens along the horizontal translation axis in such a manner that said optical axis is made normal to the lens area being measured at each of selected positions along a selected single meridian to measure the radius or radii of curvature of the polished reflecting contact lens surface at any desired number of positions.

10 Claims, 20 Drawing Figures

METHOD AND APPARATUS FOR MEASURING ASPHERIC CONTACT LENS SURFACES

BACKGROUND OF THE INVENTION

Measuring microscopes are presently known for measuring a single radius or radii of curvature of the contact lens surface but no arrangement is known to this inventor for the combined purpose of calibrated controlled tilting and controlled horizontally translating a contact lens, finished or semi-finished, while holding it in such a position that it may be tilted and shifted horizontally only symmetrically to a single plane including the optical axis of the microscope. The present invention is for the purpose of providing such an arrangement.

Other objects and advantages of the invention will be apparent from the accompanying drawings and description and the essential features thereof will be set forth in the appended claims.

In the drawings,

FIGS. 15, 16, 17 and 18 show various lens holder adapters for use in measuring different contact lenses on the measuring microscope of this invention; while

Figures 1, 1A:
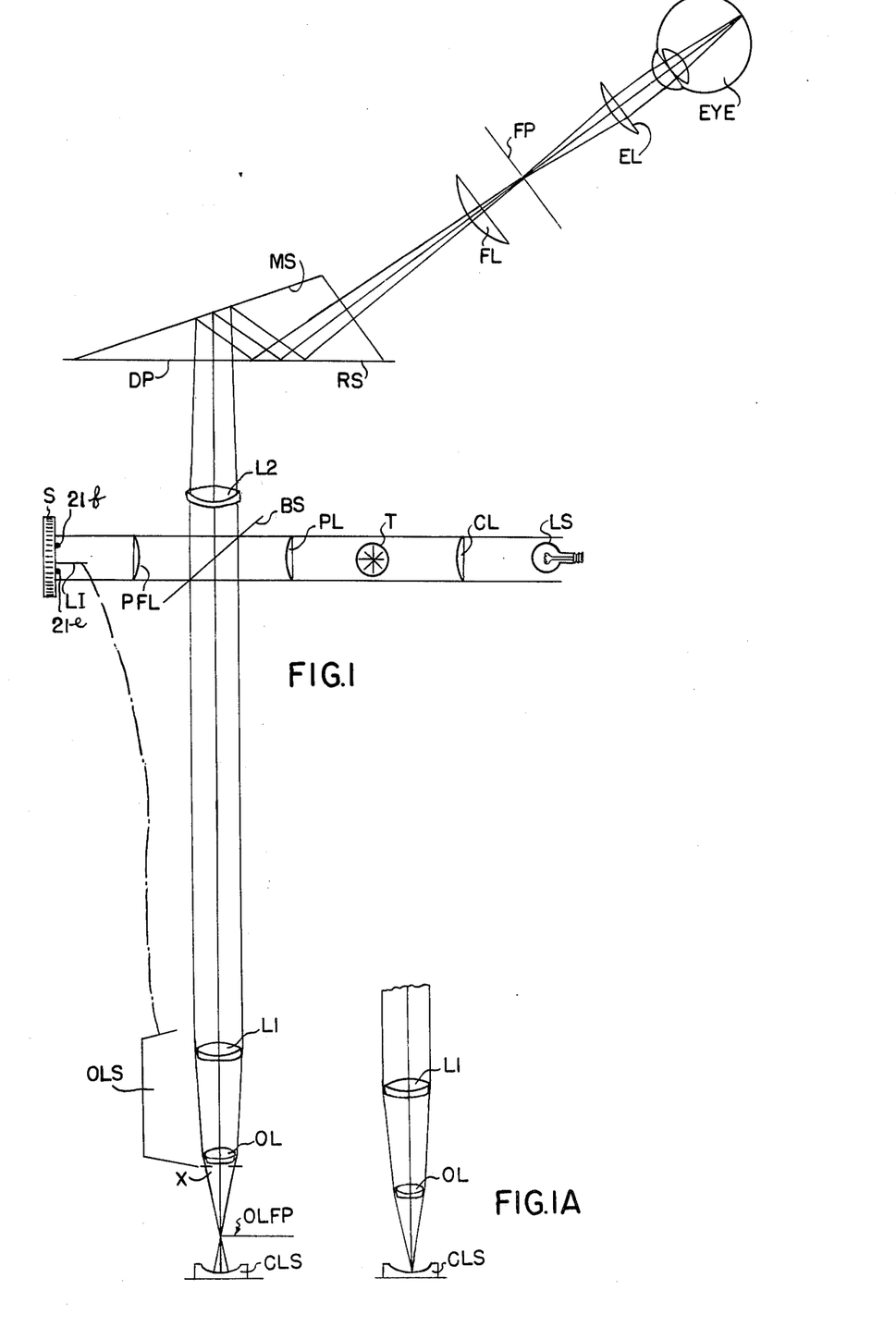
FIG. 1 is a schematic view of the operating parts of a contact lens surface measuring compound microscope, and particularly of the AO Radiuscope (trademark) of the American Optical Company which is used to describe the present invention.
FIG. 1A is a small view like the lower end of FIG. 1, but showing the zero position of the objective lens, as compared with the measuring position of FIG. 1.

In FIG. 1 there are shown schematically the operating parts of the AO Radiuscope which is used in this description to represent the contact lens surface measuring compound microscope with which the novel stage of this invention is used. The objective lens OL and L1 is mounted in the nose-piece of the microscope supported by stand 20, 20a and mounted for vertical movement and has an objective lens focal plane OLFP which is shown in FIG. 1 at the center of curvature of the measured area of a meridian of contact lens surface CLS. Above the objective lens is a converging lens L2 which directs the bundle of light rays from contact lens surface CLS to a reflecting deviating prism DP where the beam is reflected from a mirrored surface MS to a reflecting surface RS and then at an angle through a field lens FL and an eye lens EL to the eye of the observer. The eyepiece consists of the lens FL and EL and between which is the eyepiece focal plane FP which is conjugate with the objective lens focal plane. Just beneath the converging lens L2, there is seen a beam splitter BS which is inclined at 45° and is part of a subcombination including a light source LS, a condensing lens CL, a target T, and a projecting lens PL, all at the right of the main beam of FIG. 1, used by the lower surface of the beam splitter to project the image of target T to objective lens OL and L1, which in turn forms an image of said target in focal plane OLFP which then becomes the object for image formation by reflection from lens surface CLS. To the left of the main beam in the microscope is a projecting and focusing lens PFL which, by means of the upper surface of the beam splitter, allows one to focus on the vertically movable linear scale S which coacts with the horizontally adjustable line index LI to provide the measurements, seen at the focal plane FP at the eyepiece, as described in this invention. The dot-dash line connecting the linear scale over to the objective lens structure OLS indicates that these parts move up and down together. All of the other parts in FIG. 1 including the beam splitter and all parts thereabove are in fixed position in the measuring microscope and only the objective lens and the line index LI move up and down as described hereinafter in this specification.

Figure 13:
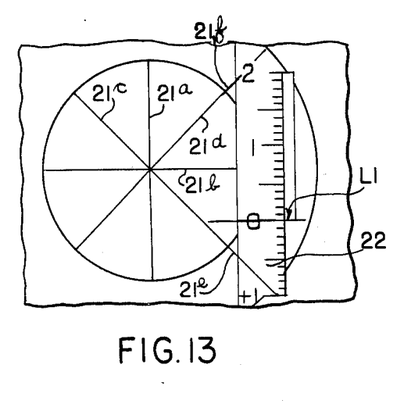
FIG. 13 is an enlarged view of a target and a fixed calibrated scale as seen through the eye piece of the microscope and the visible index line, which moves with the objective lens of the microscope, set at zero on the scale.
Figure 14:
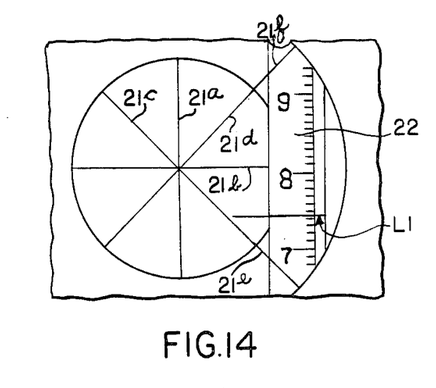
FIG. 14 is a view similar to FIG. 9 but showing the target and the calibrated scale with the visible index line in position to measure the aerial image of the target in view with the visible index line now indicating the radius of curvature of the lens surface being measured at that point.

This invention consists of an improvement in measuring microscopes presently used for measuring radii of curvature of contact lens surfaces by catoptric imagery. Such contact lens surface measuring compound microscopes are well known in the art and a good example of such an instrument is the AO Radiuscope so trademarked and manufactured by American Optical Company. The AO Radiuscope is a compound microscope having a stand 20, 20a with an internally illuminated target 21 and a linear measuring scale 22 calibrated in millimeters and usually fractions of millimeters in the field of view of the microscope eyepiece. The target as seen in FIGS. 13 and 14 consists simply of four straight lines crossing at a single point, the image of the target being projected coaxially along the optical axis of the Radiuscope onto the lens surface to be measured, the crossing point of said four lines remaining on the optical axis of the Radiuscope in said projection. One of the four lines 21a, parallel to the edge of the linear measuring scale in the field of view of the Radiuscope eyepiece, may be designated the vertical line; a second line in the target 21b perpendicular to said vertical line may be designated the horizontal line, while the two remaining lines 21c and 21d perpendicular to each other and at 45° from the horizontal and vertical lines may be designated the oblique lines. The use of the lines in the target makes it possible to measure two radii of curvature on an area of the contact lens surface when the surface area is not spherical.

The improvement of which this invention consists is a special metal contact lens surface measuring microscope stage 23 which contains a novel holder for the contact lens (which lens may be in either a semi-finished form or in a finished form) which makes possible the measurement of the radius or radii of curvature of the polished reflecting contact lens surface at any number of positions along a selected meridian of said contact lens surface. The novel stage of this invention replaces the conventional stage and attaches to the Radiuscope stand 20a by the same means and at the same points on the stand as the conventional stage. The attachment points and flat areas, hereinafter termed the stage base, are all machined in a vertical plane which shall hereinafter be termed the base plane 25 of the microscope stage, or simply, the base plane. The horizontal line of the image of the projected target image is parallel to the base plane while the vertical line of the image of the projected target image is perpendicular to the base plane.

The novel stage of this invention attaches to the stage base as follows: a vertical set of ways 26, precisely machined so that movement of the slide within the ways 26 is precisely vertical, is bolted to the stage base at the standard bolting positions 27. A horizontal cross bar 26a at the top of the ways, fastened to ways 26 by bolts 26c, has a circular hole at its center through which a finely threaded screw 28 passes to the threaded slide within the ways. A knurled knob 29 is attached to the threaded screw at the upper surface of the cross bar 26a at the top of the ways. By means of the knurled knob and the threaded screw, the remainder of the stage, rigidly attached to the vertical slide, may be moved up or down to provide the proper vertical level for the contact lens surface with respect to the desired range of up and down movement of the Radiuscope objective lens, as controlled by the focusing knobs 29a on the Radiuscope.

Extending horizontally outward at 30a from the vertical slide, perpendicular to the base plane, and then vertically upward at 30b, and attached to said vertical slide by means of two bolts 32, is the support or bracket arm 30 for the second set of ways and slide. The upper end of the support arm expands into a precisely machined flat area, perpendicular to the base plane and exactly horizontal. Two circular holes whose parallel vertical axes lie in a vertical plane perpendicular to the base plane are bored through said flat area. Attached to said flat area of said support arm is the second set of ways 31, horizontal, with the direction of the ways parallel to the base plane 25. The attachment is by means of two bolts 32 passing through the bored holes of said flat area and screwed into the base of said horizontal ways. The threaded holes of said ways are likewise precisely machined and threaded so that the vertical mid plane of the ways, parallel to the base plane, will contain the optical axis of the Radiuscope.

Figure 4:
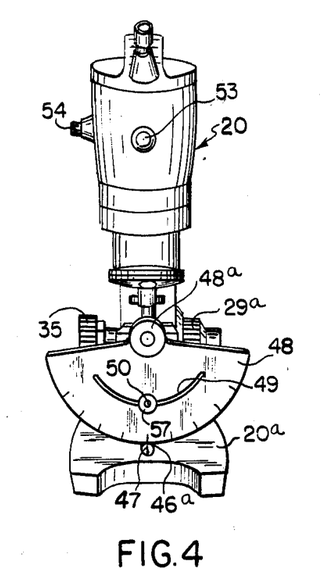
FIG. 4 is a front view of a known measuring microscope with the novel stage of this invention in place thereon.
Figure 5:
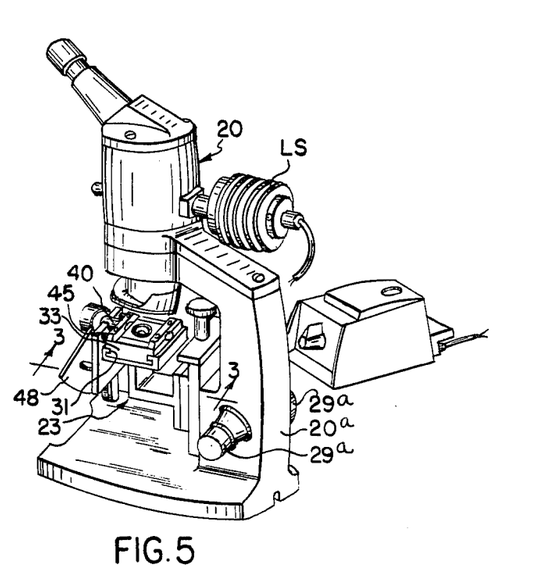
FIG. 5 is a perspective view of the same instrument taken from the right rear corner of FIG. 4 and showing the stage of the present invention in position thereon.
Figure 6:
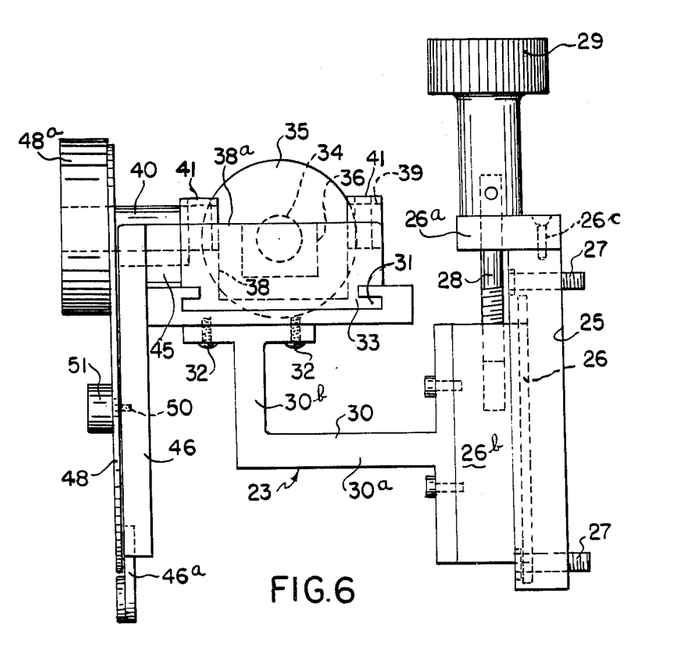
FIG. 6 is an enlarged end elevational view of the stage and lens holder of this invention taken along the line 3—3 of FIG. 5.
Figure 7:
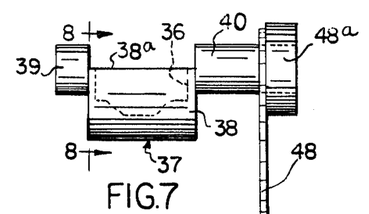
FIGS. 7, 8 and 9 are respectively side elevational view, end elevational view, and top view of the lens tilting complex of FIGS. 4 and 5 slightly enlarged.
Figure 8:
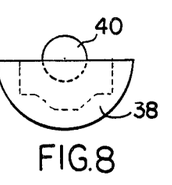
Figure 9:
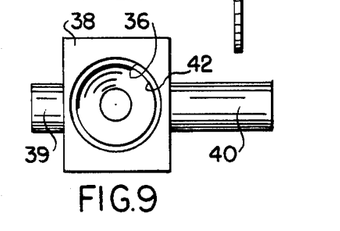
Figure 10:
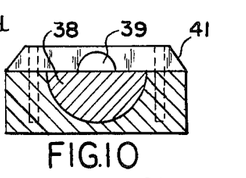
FIG. 10 is generally a sectional view along line 10—10 of FIG. 12 of the lens tilting holder in slide 31.
Figure 11:
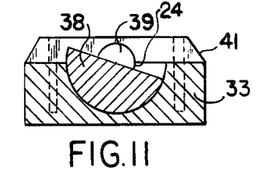
FIG. 11 is a view like FIG. 10 but showing the lens holder tilted somewhat in the horizontal slide.
Figure 12:
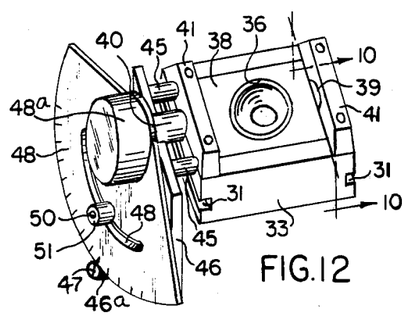
FIG. 12 is a perspective view of the horizontal slide, and the lens holder recess and lens holder adapter and the arcuate angle indicator of the lens tilting complex.

The slide 33 within said horizontal ways is likewise precisely machined and moves only horizontally and parallel to the base plane. Its movement is accomplished and controlled by means of a finely threaded screw 34 and knurled knob 35 and end plate at the left hand of the horizontal slide 33 as seen in FIG. 4, in the same manner as is the vertical movement of the vertical slide within the vertical ways. At the center of the upper horizontal surface of the horizontal slide 33 there is machined a semi-circular cylindrical recess 24, as seen in FIGS. 10 and 11, approximately 23 mm in length, whose axis is perpendicular to the base plane. The recess does not extend to the sides of the horizontal slide 33 but leaves approximately 8 mm of metal on each side of the slide. The parts shown in FIGS. 7, 8, and 9 provide a lens tilting complex 37. Means is provided for tilting this complex on a horizontal axis as follows. Coaxial with the semi-circular cylindrical recess, two additional semi-circular cylindrical borings are made, one through each side of the horizontal slide 33. Precisely mounted within said semi-circular cylindrical recess 24 and within the borings through the sides of the horizontal slide, is a special oscillatible contact lens holder 38 with integral extending coaxial shafts 39, 40 on each end which fit precisely in the semi-circular cylindrical borings through the sides of the horizontal slide. The contact lens holder and shafts having a common axis of oscillation in said coaxial borings is capable of oscillation only about said contact lens holder axis perpendicular to the base plane. The axis of oscillation of said contact lens holder and shafts, hereinafter termed the lens holder axis, and the horizontal upper surface of the horizontal slide 33, lie in the same horizontal plane. The upper portion of the contact lens holder 38a is machined flat to the level of the upper surface of the horizontal slide.

Perpendicular to the flat surface of the contact lens holder, a circularly cylindrical hole 36 approximately 20 mm in diameter and 9 mm in depth, is precisely bored within said holder with the axis of said hole intersecting perpendicularly said lens holder axis. Two brackets 41, machined to conform to the shafts 39, 40 of said contact lens holder 38 and to permit oscillation of said shafts within said brackets, are bolted to the upper surface of said horizontal slide 33 so as to maintain the lens holder axis precisely in position perpendicular to the base plane, and so that the Radiuscope optical axis and the axis of the hole 36 in the lens holder will always lie in the same vertical plane, hereinafter termed the axes plane, which is parallel to the base plane, and so that the Radiuscope optical axis and said lens holder axis are always perpendicular in direction. The point of intersection of the lens holder axis and the axes plane shall hereinafter be termed the center point. Horizontal movement of the center point can be accomplished only by movement of said horizontal slide 31 and the horizontal path of said center point movement in the axes plane is along a horizontal straight line hereinafter termed the horizontal translation axis.

Figure 15:
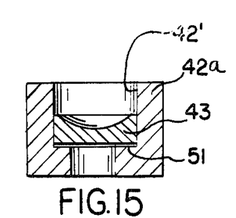
Figure 16:
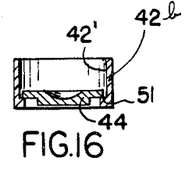
Figure 17:
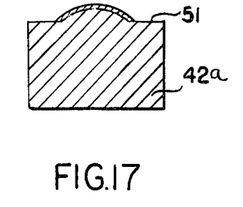
Figure 18:
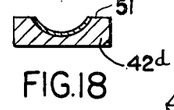

Since semi-finished contact lenses and finished contact lenses come in various shapes and sizes depending upon the manufacturer, special adapters, FIGS. 12–15, are designed to fit snugly within the hole 36 in said contact lens holder but free to rotate about the hole axis. The semi-finished contact lenses, often called buttons 43, or hats 44, or bonnets, depending upon their shape, are made to fit coaxially within said adapters which in turn are coaxial with said hole axis. Thus the contact lens or lens surface axis will remain in the axes plane and always intersect the center point. FIG. 15 shows adapter 42a for a button. FIG. 16 shows adapter 42b for a hat. FIG. 17 shows adapter 42c for a convex lens surface. FIG. 18 shows adapter 42d for a finished convex lens surface.

Figure 2:
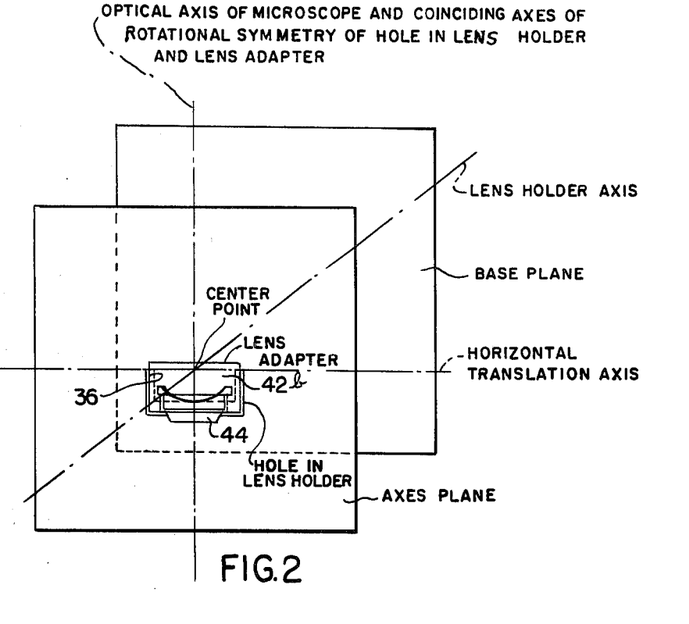
FIGS. 2 and 3 are schematic views of the essential parts of the novel stage of the present invention, with FIG. 2 showing the parts in a zero position and FIG. 3 showing the parts in a subsequent measuring position with the lens holder tilted at a selected angle.
Figure 3:
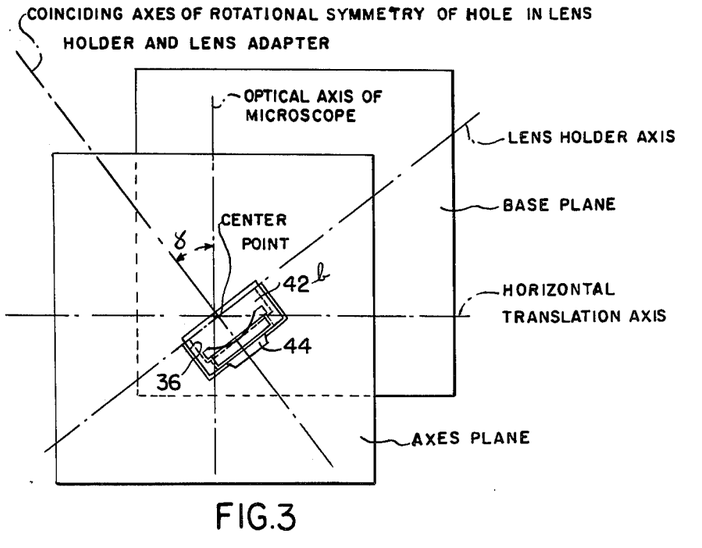

In FIG. 2 I have shown schematically the vertical base plane and the axes plane parallel to said base plane, the hole 36 in the lens holder and a contained lens adapter itself containing a semi-finished hat, 44, the optical axis of the Radiuscope and, in this instance, the axis of the hole in the lens holder and that of the lens adapter and hat coinciding with the optical axis of the Radiuscope, the horizontal translation axis and the lens holder axis. Note that all axes intersect at the center point in the axes plane. FIG. 2, showing the axis of the hole in the lens holder and that of the contained hat coinciding with the Radiuscope optical axis, is that relationship of the various axes and position of the center point, or measuring position as seen in FIG. 1, required for measuring the radius or radii of curvature at the apex of an axially symmetric contact lens surface, including surfaces of revolution and surfaces not of revolution. FIG. 3 is similar to FIG. 2 with the exception that the hole in the lens holder 36 and the axis of the hole in the lens holder lying in the axes plane, are tilted a specific angle γ with respect to the vertical optical axis of the Radiuscope, and that the center point has been displaced laterally along the horizontal translation axis. FIG. 3 shows a relationship of the various axes and the position and angle of oscillation of the lens holder required for measurement of the radius or radii or curvature at a non-apical point along a meridian section of a contact lens surface of revolution or of a contact lens surface not of revolution, both types of surfaces being symmetrical about the axis of the hole in said lens holder, and for the measurement of the radius or radii of curvature at a point along an orthogonal section of a contact lens surface not having axial symmetry when said orthogonal section coincides with the axes plane. Note that the angle of oscillation of the lens holder axis and the displacement of the center point must be such that the normal to the center of the surface area being measured and the optical axis of the Radiuscope must coincide during a measurement. Note in FIG. 3, that the lens holder has shifted a small distance, toward the right from FIG. 2, by the use of knob 35 and screw 34, so that the optical axis of the microscope is normal to the area being measured. FIGS. 2 and 3 both show the surface area being measured as concave and lying below the level of the lens holder axis and this is generally the case for the measurement of concave contact lens surfaces. For the measurement of convex contact lens surfaces, the lens holder axis generally lies below the lens surface being measured.

Means is provided to indicate the angle γ to which the lens tilting complex is set, as follows. Attached to the horizontal slide by means of two spacers 45 and bolts is a vertical plate 46, parallel to the base plane, which extends downwards and at its lower end contains a protruding disc 46a with a vertical fiducial line mark 47. Said vertical line mark is directed exactly vertically and is parallel to the optical axis of the Radiuscope, directed exactly toward the horizontal lens holder axis, and because of its attachment to the horizontal slide 33, it moves with said slide during its horizontal adjustment by means of rotation of the knob 35 and screw 34 threaded into said horizontal slide, thereby always retaining the perpendicular intersecting relationship between the lens holder axis and the vertical direction of said fiducial line. Attached tightly to the forward portion 40 of the shaft of said lens holder and oscillatible with it about said lens holder axis, is an arcuate scale 48 marked in degrees. The scale is moved by knob 48a rigid with the scale and with shaft 40 of the lens holder complex. The zero point on said arcuate scale is set so that when the axis of the hole in said lens holder is coaxial with or parallel to the optical axis of the Radiuscope, the zero line on said arcuate scale is aligned with said vertical fiducial line mark 47 as seen in FIG. 4. Extending from said vertical plate through a long arcuate slot 49 in said arcuate scale is a threaded bolt 50 which is used with a lock nut for the purpose of locking the arcuate scale and attached lens holder at a desired angular setting.

To those familiar with the Radiuscope and with other similar contact lens surface radius of curvature measuring microscopes, I will summarize the fundamental linear motions, angular oscillations, and rotations which the novel stage of this invention permits.

1. The stage may be moved vertically by means of the knob 29 and attached threaded adjusting screw 28 threaded into the vertical slide 26 within its ways, thereby making is possible to adjust the vertical position of the Radiuscope objective lens by means of the Radiuscope focusing knobs 29a such that the zero position of the linear millimeter scale will be brought to an appropriate position, FIG. 13 within the field of view of the Radiuscope eyepiece for the measurement of radii of curvature of either positive or negative contact lens surfaces.

2. The lens adapter 42b and contained lens surface 44 may be rotated within the hole 36 in the lens holder 38 about a common axis for the lens holder, lens adapter 42 and lens surface 44. This permits the adjustment of the principal meridians of the lens surface to be measured to the horizontal and vertical positions when the surface is astigmatic at its apex. It also permits the adjustment of the vertical principal plane of symmetry of the variable surface of a progressive power contact lens to a position coinciding with the axes plane, for the measurement of lens surface radii of curvature along the principal curve of said surface at desired positions. Such a variable surface of a progressive power contact lens is described in my U.S. Pat. No. 3,950,082, "Ophthalmic Lens for Presbyopia and Aphakia", granted Apr. 13, 1976.

3. The horizontal slide 33 may be moved by knob 35 and threaded screw 34 exactly horizontally and parallel to the base plane over a sufficiently long path so that when measuring along a meridian of a surface of revolution or a principal meridian of a surface not of revolution having axial symmetry, or along a principal curve of a variable surface, by oscillation of the lens holder about the lens holder axis, the lens surface can be moved horizontally as described above, with respect to FIG. 3, so that the measured surface can always be brought to that horizontal position where the optical axis of the Radiuscope is normal to the central portion of the surface area being measured. The center point of FIG. 2 indicates the zero position of the horizontal slide 33, where the optical axis of the microscope coincides with the axes of rotational symmetry of the hole 36 in the lens holder and the lens adapter 42. This zero position may be so marked on slide 33. Hence the radii of curvature can be measured in the horizontal and vertical principal directions about said normal along any number of normals along the entire extent of the meridian of the surface measured.

4. The lens holder may be oscillated about the lens holder axis to any desired angular settings, up to 60° in either direction from the zero setting, by oscillation of the arcuate scale 48, tightly attached to said lens holder 38, and locked in position at said angular setting with said arcuate scale lock nut 50, automatically maintaining the lens surface axis and the associated horizontal principal curve of the measured surface (when said surface has axial symmetry) in the axes plane; or automatically maintaining the principal curve of a variable surface of a progressive power contact lens in the axes plane.

It is of significance in this invention that all motions, oscillations and adjustments of which the novel stage, and its parts, are capable, are designed to facilitate and maintain all measurements about normals to and along a single meridian, or about the normals to and along a single principal curve.

To insure that the reflecting area of a contact lens surface involved in the measurement of radii of curvature of said contact lens surface is quite small, a factor which is of significance when measuring aspheric surfaces, an aperture stop with a small coaxial aperture approximately 2.5 mm in diameter is placed in front attached to, and movable with, said Radiuscope objective lens, shown in FIG. 1 at point X. The area of contact lens surface involved in producing the reflected image of the projected Radiuscope target may thus be reduced in a diameter to less than 1 mm, while, because of positioning of the aperture stop in front of the objective lens, there remains illuminated and visible in the eyepiece field of the Radiuscope, the linear measuring scale 21, the index line LI, and a pair of oblique locating lines 21e, 21f as shown in FIGS. 13 and 14, which indicate the centering of the aerial image, "real" image for a concave contact lens surface and "virtual" image for a convex contact lens surface, when aligned with lines 21c and 21d of the target as seen in the eyepiece field, said centering indicating that the optical axis of the Radiuscope and the normal to the contact lens surface area being measured conincide.

The height or distance of the apex of the contact lens surface to be measured with respect to the lens holder axis is controlled by a supporting ledge 51 within the lens adapter, the plane of said supporting ledge being parallel to the lens holder axis and perpendicular to the axis of the hole in the lens holder, while the inner cylindrical wall 42' of the lens adapter is centered about the axis of said hole in said lens holder. In other words, all portions of said lens adapter are coaxial. For negative or concave contact lens surfaces, the ledge is at such level that said lens holder axis lies above the apex of the lens surface to be measured, the distance between said apex and said axis being approximately 7.50 mm, while for positive or convex contact lens surfaces, the level of the ledge of the adapter is at such level that the lens holder axis lies below the apex of the contact lens surface to be measured by approximately 7.50 mm. Such positioning of the negative and positive contact lens surfaces reduces the amount of horizontal translational movement required of the horizontal slide to maintain the aerial images produced by the contact lens surfaces centered in the field of the eyepiece.

As constructed, the novel contact lens measuring microscope stage of this invention thus provides means and controls for the measurement of the meridian and transmeridian radii of curvature along a very narrow band of contact lens surfaces, said band approximately 1 mm in width, when using aperture stop at X in FIG. 1, said band being along and containing in a midposition a meridian section of said measured surface when said surface is one of rotational symmetry, or said band being along and containing in a midposition a principal meridian of a surface not of revolution when said surface is one of axial symmetry, or said band being along and containing in a midposition a principal curve of a variable surface of a progressive power contact lens. It is to be noted that the axes plane is orthogonal to the surfaces measured along each of the curves just described.

The usefulness of said novel contact lens measuring microscope stage of this invention lies in the fact that it provides precisely controlled means of very accurately measuring variations of radii of curvature of contact lens surfaces from the apex to the periphery of surfaces having an axis of symmetry, including toric surfaces, conicoids of revolution, and special surfaces not of revolution having an axis of symmetry such as ellipsoids not of revolution and elliptic paraboloids, said surfaces having two principal meridians along which radii of curvature change; and special surfaces having a single plane of symmetry and a principal curve in said plane of symmetry which changes in radii of curvature along said curve.

The novel contact lens surface measuring microscope stage of this invention is especially useful for the measurement of conicoid of revolution contact lens surfaces described in my U.S. Pat. No. 3,482,906, "Aspheric Contact Lens Series", granted Dec. 9, 1969 and provides a means for verification of eccentricity of said conicoid surfaces. For example, radii of curvature measurements may be made at two-degree intervals along a meridian section of a conicoid contact lens surface and the apical radius or curvature and the meridian and transmeridian radii obtained at said intervals can be compared to data of a conicoid of revolution surface of said apical radius of curvature and calculated meridian and transmeridian radii of curvature for said intervals, presented in tabular form, to identify the specific conicoid surface measured.

The novel contact lens surface measuring microscope stage of this invention is especially useful for quality control in contact lens manufacturing laboratories which produce the conicoid contact lens surfaces of my invention, U.S. Pat. No. 3,482,906, by verifying the apical radii of curvature and eccentricities of the surfaces produced. For example, for prolate ellipsoids, paraboloids and hyperboloids of two sheets, such verification of eccentricity is easily done by measuring the meridian and transmeridian radii of curvature of the surfaces of a preselected angular setting of the arcuate angular scale of the novel stage of this invention and applying the following equation:

$$e = [1 - (r_1/r_2)]^{\frac{1}{2}}/\sin \gamma \qquad (1)$$

where e is the eccentricity of the surface, $\gamma$ is the preselected angle of oscillation of the lens holder about the lens holder axis indicated by means of the arcuate angular scale 48, $r_1$ is the transmeridian radius of curvature measured with the Radiuscope with the lens holder of the novel stage of this invention locked in position at angle $\gamma$, and $r_2$ is the meridian radius of curvature measured with the Radiuscope at said same locked position. For example, if preselected $\gamma = 19°$, $r_1 = 7.679$ mm and $r_2 = 8.268$ mm, then applying these values to Eq. 1, the eccentricity of the surface measured is 0.820. Note that the eccentricity is determined with the Radiuscope utilizing the novel stage of this invention by means of Eq. 1 without the necessity of determining the apical radius of curvature of the contact lens surface, which apical radius of curvature may be determined very quickly by setting $\gamma =$ to zero and measuring the apical radius of curvature directly which in this example is 7.400. One may preselect other angles of $\gamma$ or more than one angle $\gamma$ and thereby verify that the eccentricity determined at one angular setting is the same as that determined at another value for $\gamma$, or that the eccentricity determined at two or more settings of angle $\gamma$ is constant to within the tolerances of measurement, generally ±0.04 eccentricity units.

Figure 19:
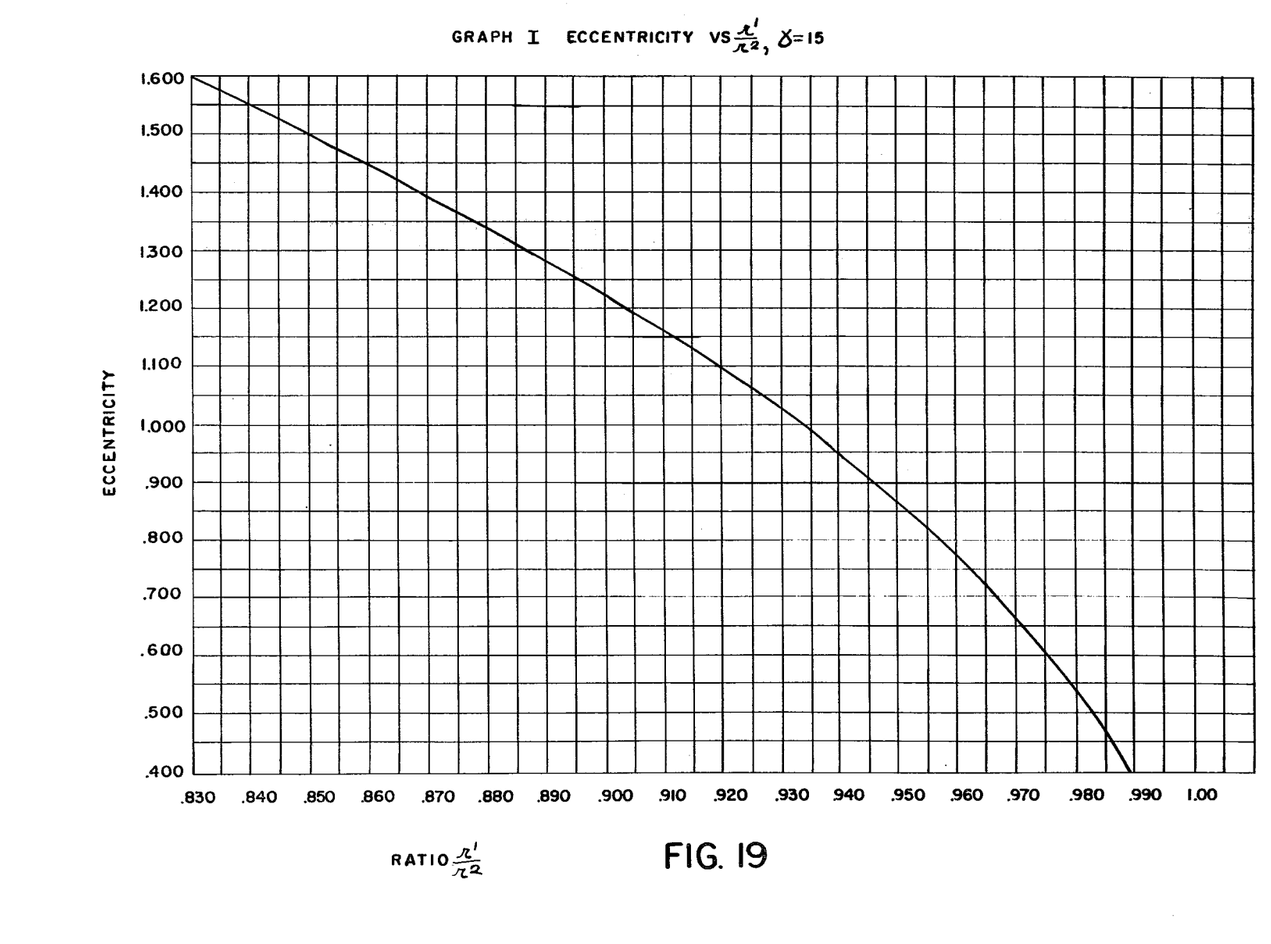
FIG. 19 is a graph using the same data as shown in Table I.

Referring to Eq. 1, it is seen that for a given angle $\gamma$ which is kept constant, at 15° for example, there remains only two variables in the equation, $r_1$ and $r_2$. It is therefor very practical to compute a table of ratios of $r_1/r_2$ and the associated eccentricities. From such a table of values a graph may be constructed in which eccentricity is plotted against said ratio. The determination of eccentricity by the user of the invention would then require only the minimum of calculation, i.e., the division of $r_1$ by $r_2$ to obtain the ratio. Once the ratio is determined, reference to the graph yields the eccentricity. Table 1 is a tabulation of ratios and associated eccentricities, for a constant value of $\gamma = 15°$, and Graph 1, FIG. 19, is the same data presented graphically. Several graphs may be produced, each for a different value of $\gamma$, so that eccentricity may be verified for a given conicoid contact lens surface at various angles of $\gamma$.

Table I ($\gamma = 15°$)

| ratio $\frac{R_1}{R_2}$ | e(eccentricity) | ratio $\frac{R_1}{r_2}$ | e(eccentricity) |
|---|---|---|---|
| 0.990 | .386 | 0.910 | 1.159 |
| 0.985 | .457 | 0.905 | 1.191 |
| 0.980 | .546 | 0.900 | 1.222 |
| 0.975 | .611 | 0.895 | 1.250 |
| 0.070 | .669 | 0.890 | 1.280 |
| 0.965 | .723 | 0.885 | 1.310 |
| 0.960 | .773 | 0.880 | 1.338 |
| 0.955 | .820 | 0.875 | 1.369 |
| 0.950 | .860 | 0.870 | 1.393 |
| 0.945 | .906 | 0.865 | 1.420 |
| 0.940 | .946 | 0.860 | 1.446 |
| 0.935 | .985 | 0.855 | 1.470 |
| 0.930 | 1.022 | 0.850 | 1.496 |
| 0.925 | 1.058 | 0.845 | 1.521 |
| 0.920 | 1.093 | 0.840 | 1.545 |
| 0.915 | 1.126 | 0.835 | 1.569 |
|  |  | 0.830 | 1.593 |

For the measurement of oblate ellipsoid contact lens surfaces by means of this invention, one may measure the meridian and transmeridian radii of curvature at a preselected angle $\gamma$ and from said measurements calculate the eccentricity of the elliptical meridian section of said surfaces. Tables and graphs may likewise be produced wherein for a given value of angle $\gamma$, the ratio of $r_1/r_2$ or its inverse may be used to indicate the eccentricity of a meridian section of a surface. The apical radius of curvature of the oblate ellipsoid contact lens surface is measured by setting angle $\gamma = 0$ and measuring the apical radius of curvature directly.

An additional feature which may be added to the novel microscope stage of this invention would be the calibration of the horizontal translational movement of the horizontal slide by means of a calibrated metric micrometer screw at 34. An obvious advantage of calibrating the movement of the horizontal slide would be in returning the horizontal slide to the zero position in which the lens holder axis is intersected by the optical axis of the telescope.

The alignment of the axis of the hole in the lens holder to be coaxial with the optical axis of the Radiuscope as well as the determination of the zero setting for said arcuate scale, and the determination of the zero position for the horizontal slide may all be achieved mechanically by removing the Radiuscope objective lens and replacing it with a circularly cylindrical rod, threaded into the threads normally used to hold the objective lens, the diameter of the rod being such that it just fits into the circular hole 36 of the lens holder. The novel stage is then elevated by the vertical adjustment knob 29 and associated slide and the Radiuscope objective lens mount is lowered by means of the focusing knob 29a until the rod fits snugly without binding into said hole in said lens holder. When this is achieved, the zero marker on the arcuate scale is set in alignment with the fiducial line mark 47 on the disc 46a attached to said vertical plate 46. The zero position for the horizontal slide may also be set at the same time. Once the alignment is achieved, the novel stage is lowered and the Radiuscope objective lens mount is elevated, the rod is removed and replaced with the objective lens.

The novel stage of this invention may also be aligned optically by placing a standard contact lens surface in an adapter within the lens holder and using optical sightings as the basis for the zero position settings.

For the measurement of finished lenses, the lenses are applied to buttons or hats having a diameter and curvature of the optical portion approximately that of the finished lens to be measured. For the measurement of concave contact lens surfaces, a droplet of oil is placed in the concavity of the hat or button and the convex surface of the finished lens is then placed onto the mineral oil and gently pressed against the hat or button to seat the finished lens and adjust it into correct position. The use of the mineral oil which has the same or nearly the same index of refraction as the contact lens material, eliminates the reflections from the lower convex surface of the finished contact lens. The mineral oil also aids in keeping the finished contact lens in a fixed position on the hat or button. For the measurement of convex surfaces of finished contact lenses, the hat or button has a protruding convex optical portion against which the concave surface of the finished contact lens is placed, again with the mineral oil between the opposing surfaces.

Although the novel stage of this invention has been described in conjunction with the AO Radiuscope, it should be understood that this invention is applicable to contact lens surface measuring microscopes produced by other manufacturers.

Many contact lens surface measuring microscopes utilize an external dial gauge coordinated with the position of the objective lens of the microscope, rather than an internal linear scale seen within the eyepiece field. It is intended that the novel stage of this invention be applicable to such contact lens surface measuring microscopes.

The method of operating the apparatus of this invention is as follows:

One begins by oscillating the lens holder about the lens holder axis until the axis of symmetry of the hole in the lens holder is precisely vertical as indicated by the coincident alignment of the zero position marking on the arcuate angle indicator with the vertical fiducial line mark, and locking the arcuate angle indicator in this zero position. Then one transports simultaneously, by the horizontal slide, the lens holder, arcuate scale indicator, and fiducial line mark horizontally in a direction parallel to the base plane until the center point is intersected by the microscope optical axis which is then coincident with the axis of symmetry of the hole 36 in the lens holder, as indicated by the zero setting of the horizontal slide. Then one places the lens surface to be measured in the lens adapter where it is then placed in the hole 36 in the lens holder. Then simultaneously adjust vertically the center point and the objective lens along the coincident optical axis and said axis of symmetry until the target image is located at the contact lens surface, as indicated by a sharply focused image of the target image in the field of view of the eyepiece, and continuing said simultaneous adjustment while retaining the clarity of the eyepiece image of the target image until the zero point of the linear scale image is located about mid-level of the eyepiece field. Then adjust the line index image LI to coincide with an exact millimeter reading on the linear scale image. Then cause movement in an axial direction of the microscope objective lens until the aerial image of the objective lens target image, serving as the object for the contact lens surface being measured, is at the approximately center of curvature of the contact lens surface area being measured as indicated by a relatively clear image of the aerial image as formed by the objective lens, seen in the center of the eyepiece field. Then focusing sharply upon the aerial image and, if all target image lines seen in the eyepiece field are equally sharp, reading the value for the radius of curvature of said lens surface area as indicated by the line index LI on the linear millimeter scale 21 in the eyepiece field, as indicated by the algebraic difference between the first and second readings of the index line position on the linear scale. Alternately, if in the preceding step, all eyepiece image lines of the aerial image are not equally sharp, causing roation of the contact lens surface about its axis of symmetry by rotation of the adapter in the hole in the lens holder, until the horizontal or the vertical focal lines of the aerial image, as seen in the eyepiece field, are of maximum sharpness. Next, by means of the microscope focusing knob, sharply focusing upon a horizontal line of the aerial image as seen in the eyepiece field, and noting the radius of curvature as indicated by the algebraic difference of the two readings of the line index position on the millimeter linear scale in the eyepiece field, then sharply focusing upon a vertical focal line of the aerial image and noticing the radius of curvature as indicated by the algebraic difference of the two readings of the index line positions on the linear millimeter scale. Then loosening the lock nut of the arcuate angle indicator, then causing oscillation of the contact lens surface in said adapter about said lens holder axis to a preselected angle γ, then again tightening the lock nut on the arcuate angle indicator. Then causing movement of the center point along the horizontal translational axis until the microscope image of the aerial image is centered within the eyepiece field. Next, adjusting the microscope objective lens until the objective lens target image is located at the contact lens surface, as indicated by a sharply focused image of the target image in the field of view of the eyepiece. Then adjusting the line index image to coincide with an exact millimeter marking on the linear millimeter scale image. Next, causing movement in the axial direction of the microscope objective lens until the aerial image of the objective lens image, serving as the object for the contact lens surface being measured, is at the approximate center of curvature of the contact lens surface area being measured, as indicated by relatively clear image of either the horizontal or the vertical focal lines of the aerial image as formed by the microscope and seen in the center of the eyepiece field. Then, sharply focusing upon the horizontal line of the aerial image as seen in the eyepiece field and noting its radius of curvature as indicated by the algebraic difference of the two positions of the line index on the linear millimeter scale in the eyepiece field. Such radius of curvature being that of the lens surface area being measured in a direction at right angles to the horizontal meridian, then focusing sharply upon the vertical focal line of the aerial image as seen in the eyepiece field and noting its radius of curvature as indicated by the algebraic difference between the two readings of the line index on the linear millimeter scale in the eyepiece field, said radius of curvature being that of the lens surface area being measured in a direction along the horizontal meridian. And finally, repeating the steps mentioned above after "causing oscillation of the contact lens surface about the lens holder axis through a preselected angle γ", for as many angles γ as desired, on both sides of the value γ=0.

Wherever in the specification and claims the phrase "measuring a surface" or the like occurs, it refers to measuring a surface on optical material of a contact lens either finished or semi-finished.

The description herein refers to measuring contact lens surfaces but it is intended to apply to measuring molds for forming such lens surfaces, or in any case, the invention may be used to measure optical surfaces, or molds for forming the same, of a size and curvature similar to contact lenses.

Applicant has described the use of rectangular ways and interfitting slides for vertical motion at 25, 26; and for horizontal motion at 31, 33. It will be understood that V-ways and slides, or cylindrical ways and slides might be used, or any other suitable means might be substituted at such places.

What is claimed is:

1. A method of using a contact lens surface measuring compound microscope, having a vertical base plane, to determine multiple radii of curvature of a curved optical surface along a single selected meridian, wherein said microscope has a stand supporting said microscope with an objective lens at its lower end and an eyepiece at the upper end, said objective lens axially movable along a vertical optical axis parallel to said base plane, said microscope having a calibrated vertical linear scale movable with said objective lens with means for imaging said scale as a visible movable scale image within said eyepiece field, said microscope having visible within its eyepiece field the image of a horizontally adjustable line index which is fixed with respect to said movable linear scale image, with means for focusing simultaneously in the image plane of said eyepiece on said movable linear scale image and said line index image, comprising holding a portion of the lens to be measured in a predetermined spot along said optical axis below said objective lens, measuring a radius or radii of curvature of said lens at said spot, and then tilting said lens about a lens holder axis constrained to be always normal to said base plane while holding said lens symmetrical to an axes plane parallel to said base plane, said axes plane bisecting said spot and including said optical axis of said microscope, stopping said tilting about said lens holder axis at desired angular positions, and at each of said positions moving said lens horizontally and parallel to said base plane along a fixed horizontal translation axis parallel to said vertical base plane until said optical axis is normal to said lens surface along said single selected meridian, and there again measuring the radius of radii of curvature of said lens, said optical axis of the measuring microscope, said horizontal translation axis, and said lens holder axis being constrained at all times to be mutually perpendicular.

2. The method of claim 1, there being an axially centered target image within said microscope whose image is projected through the objective lens coaxial to and along said microscope optical axis to a given focal plane at a fixed distance below said objective lens, and said objective lens focal plane being conjugate to a fixed focal plane within the eyepiece at the upper end of said microscope, said linear scale image calibrated in millimeters and fractions thereof and visible in a lateral portion of the eyepiece field of said microscope and said index line image within said eyepiece field paralleling the markings of said linear scale image, axial movements of said microscope objective lens up and down along said microscope optical axis being interlocking with and paralleling the movement of the linear scale image moving through said eyepiece focal plane, the difference in scale markings in millimeters and fractions thereof indicated by the index line image for two positions of said objective lens being a measure of the vertical movement of said objective lens from a first position to a second position; comprising the holding of a contact lens surface to be measured facing upward beneath said objective lens and within a lens adapter which in turn is fit snugly and freely rotatable within a circularly cylindrical hole in an oscillatable lens holder, the axis of oscillation of said lens holder being horizontal, and perpendicular to a vertical base plane paralleling said microscope optical axis, there being a common axis of rotational symmetry for said hole in said lens holder and said adapter and said contact lens surface when said contact lens surface is a surface of revolution about said common axis of rotational symmetry, said axis of symmetry intersecting said lens holder axis at a center point contained within an axes plane parallel to said base plane and containing the optical axis of said microscope, said common axis of rotational symmetry also being the axis of symmetry of surfaces not of revolution having two principal meridians; including the following enumerated procedural steps:

(a) Oscillating said lens holder about said lens holder axis until said axis of symmetry of said hole in said lens holder is precisely vertical as indicated by the coincident alignment of the zero position marking on an arcuate angular scale rigidly attached to said lens holder with a vertical fiducial line mark and locking said arcuate scale in said zero position;

(b) Transporting simultaneously said lens holder, arcuate scale, and fiducial line mark horizontally along said fixed linear horizontal guide in a direction parallel to said base plane until said center point is intersected by said microscope optical axis which is then coincident with said axis of symmetry as indicated by the zero setting of said horizontal slide;

(c) Placing a lens surface to be measured in said lens adapter which in turn is placed in said hole in said lens holder;

(d) Simultaneously adjusting vertically said center point and said objective lens along said coincident optical axis and said axis of symmetry until said target image is located at the contact lens surface, as indicated by a sharply focused image of said target image in the field of view of said eyepiece, and continuing said simultaneous adjustment while retaining said clarity of said eyepiece image of said target image until a selected starting point of said linear scale image is located about midlevel of said eyepiece field;

(e) Adjusting said line index image to coincide with said starting point marking on said linear scale image;

(f) Causing movement in an axial direction of said microscope objective lens until the aerial image of said objective lens target image serving as the object for the contact lens surface being measured, is at the approximate center of curvature of the contact lens surface area being measured as indicated by a relatively clear image of said aerial image as formed by said objective lens at its focal plane and seen in the center of the eyepiece field;

(g) Focusing sharply upon said aerial image and, if all target image lines seen in the eyepiece field are equally sharp, reading the value for the radius of curvature of said surface area, as indicated by said line index on the linear millimeter scale in said eyepiece field as indicated by the algebraic difference of said two readings of index line positions on said scale;

(h) If in step (g) above, all eyepiece image lines of said aerial image are not equally sharp, causing rotation of said contact lens surface about its axis of symmetry by rotation of said adapter in said hole in said lens holder, until the horizontal or the vertical focal lines of the aerial image as seen in the eyepiece field is of maximum sharpness;

(i) Following step (h), by means of said microscope focusing knob sharply focusing upon the horizontal lines of said aerial image as seen in the eyepiece field and noting the radius of curvature, as indicated by the algebraic difference between the two positions of said line index on the millimeter scale in the eyepiece field, then sharply focusing upon the vertical focal line of said aerial image and noting the radius of curvature as indicated by the algebraic difference between the two positions of said line index on the linear millimeter scale.

(j) Loosening said lock nut, causing oscillation of said contact lens surface about said lens holder axis to a preselected angle $\gamma$;

(k) Causing movement of said center point along said horizontal translation axis until the microscope image of said aerial image is centered within the eyepiece field;

(l) Adjusting said microscope objective lens until said objective lens target image is located at the contact lens surface, as indicated by a sharply focused image of said target image in the field of view of said eyepiece;

(m) Adjusting said line index image to coincide with an exact millimeter marking on said linear scale image and noting same;

(n) Causing movement in an axial direction of said microscope objective lens until the aerial image of said objective lens image serving as the object for the contact lens surface being measured, is at the approximate center of curvature of the contact lens surface area being measured as indicated by a relatively clear image of either the horizontal or the vertical focal lines of said aerial image as formed by said microscope and seen in the center of the eyepiece field;

(o) Sharply focusing upon the horizonal line of said aerial image as seen in the eyepiece field and noting its radius of curvature as indicated by the algebraic difference of the two positions of said line index on the millimeter scale in the eyepiece field, said radius of curvature being that of the surface area being measured in a direction at right angles to the horizontal meridian, then focusing sharply upon the vertical focal lines of said aerial image as seen in the eyepiece field and noting the radius of curvature as indicated by the algebraic difference between two readings of said line index on the milimeter scale in the eyepiece field, said radius of curvature being that of the lens surface area being measured in a direction along the horizontal meridian;

(p) Repeating steps (j) through (o) for as many angles $\gamma$ as desired, on one or both sides of the value $\gamma=0$.

3. The method of claim 2, wherein said target image comprises a vertical and a horizontal line crossing at right angles and two crossing oblique lines at right angles to each other and at 45° from said vertical and horizontal lines.

4. The method of claim 2, wherein the contact lens surfaces being measured are conicoids of revolution including prolate ellipsoids, paraboloids and hyperboloids of two sheets and the apical radius of curvature of any of said surfaces is measured by means of procedural steps (a) through (g) and the eccentricity of any of said surfaces is determined by procedural steps (j) through (o) wherein the sharply focused horizontal focal line of said aerial image as seen in the eyepiece field and the radius of curvature indicated by said horizontal focal line indicates the transmeridian radius of curvature of said measured surface area and wherein the sharply focused vertical focal line of said aerial image as seen in the eyepiece field indicates the meridian radius of curvature of said measured surface area, and where the eccentricity of said surface is determined by means of the following equation:

$$e=[1-(r_1/r_2)]^{\frac{1}{2}}/\sin \gamma$$

where e is the eccentricity of the surface measured, and where $r_1$ is the transmeridian radius of curvature measure at said surface area at said preselected angle $\gamma$, and where $r_2$ is the meridian radius of curvature measured at said surface area at said preselected angle $\gamma$, $r_1$ always being a value less than $r_2$, and where $\gamma$ is the preselected angle of oscillation of said lens holder.

5. The method of claim 4 wherein more than one angle $\gamma$ of oscillation is used for the determination of eccentricity of said conicoid surfaces.

6. The method of claim 2 wherein the contact lens surface to be measured has two principal meridians and a centered axis of symmetry coinciding with said axis of rotational symmetry of said hole in said lens holder, said surfaces including toric surfaces, ellipsoids not of revolution, and elliptic paraboloids, and other similar surfaces having two principal meridians which are conics, wherein a series of meridian and transmeridian radius of curvature measurements are made along a first principal meridian of such a surface, including the apex, the adapter then being rotated 90° and a series of meridian and transmeridian measurements of meridian and transmeridian radii of curvature are then made along the second principal meridian.

7. The method of claim 2 wherein the contact lens surface measured is a variable surface of a progressive power contact lens having a single plane of symmetry, and a principal curve varying in curvature progressively in said plane of symmetry, rotating said adapter until said plane of symmetry coincides with the axes plane, said coincidence being indicated by the fact that the horizontal focal line of the eyepiece image of said aerial image can always be brought to a sharp focus and will remain horizontally centered in the eyepiece field, and making measurements of two principal radii of curvature along the extent of the principal curve at given intervals of angle $\gamma$.

8. The method of claim 2 wherein the contact lens surface measured is an oblate ellipsoid.

9. The method of claim 2 wherein said calibrated linear scale has a zero indication and said exact starting point of step (d) is said zero indication, whereby said algebraic difference of step (g) is read directly by the position of said line index on said calibrated linear scale.

10. Apparatus for use with a measuring microscope, having a stand holding a microscope on a vertical optical axis and terminating in an objective lens at the bottom thereof, to measure a thin planar zone across and normal to an aspheric lens surface, comprising a base plate having a vertical surface adapted to be rigidly attached to a vertical surface of said microscope stand, said plate having vertically extending ways therein, a vertical slide fitting in said vertical ways, means for vertically adjusting said slide in said ways, a bracket rigid with said vertical slide and extending forwardly therefrom and then upwardly, horizontal ways rigidly attached to said upwardly extending end of said bracket, a horizontal slide fitting in said horizontal ways, means for horizontally adjusting said horizontal slide in said horizontal ways, a lens tilting complex oscillatably mounted in said horizontal slide tiltable on an axis at right angles to said horizontal ways, a lens holder recess opening upwardly in said complex between said horizontal ways, a lens holder adapter fitting snugly and rotatably in said recess, said complex carried by shaft means rigid with said complex and journalled in said horizontal slide, said shaft means having an axis at right angles to said base plane, said complex having an arcuate angle indicator rigid with said shaft means at the front end thereof and extending radially thereabout, a basic marker holder rigid with said horizontal slide extending to the edge of said angle indicator and there bearing a fiducial line, and means for holding said tilting complex in any of its possible adjusted positions, all of said parts being adjustable to position a limited portion of said lens surface in said lens holder adapter with the normal to said lens portion below said objective lens coinciding with said measuring microscope optical axis and maintaining a selected meridian of said lens in a fixed plane parallel to said base plane.

* * * * *